United States Patent [19]

Imhäuser et al.

[11] 4,247,238
[45] Jan. 27, 1981

[54] STACKING AND UNSTACKING APPARATUS

[75] Inventors: Gerd Imhäuser, Nister; Gerhard Puderbach, Neuwied, both of Fed. Rep. of Germany

[73] Assignee: Winkler & Dunnebier Maschinenfabrik & Eisengiesserei GmbH & Co. KG, Neuwied, Fed. Rep. of Germany

[21] Appl. No.: 962,531

[22] Filed: Nov. 20, 1978

[30] Foreign Application Priority Data

Dec. 13, 1977 [DE] Fed. Rep. of Germany ....... 2755443

[51] Int. Cl.³ .......................... A23G 7/00; B65G 61/00
[52] U.S. Cl. ...................................... 414/43; 414/79; 414/113; 414/125; 414/917; 198/488
[58] Field of Search ................. 414/28, 29, 43, 78, 414/79, 92, 93, 95, 96, 97, 112, 113, 125, 569, 589, 680, 732, 733, 742, 917; 198/487, 488, 621

[56] References Cited

U.S. PATENT DOCUMENTS

| 2,844,263 | 7/1958 | Dreyer | 414/28 |
| 2,948,382 | 8/1960 | Russell | 414/95 X |
| 3,122,240 | 2/1964 | Steels | 414/79 X |
| 3,458,058 | 7/1969 | Faerber | 414/79 |

FOREIGN PATENT DOCUMENTS 441017 12/1974 U.S.S.R. ................................ 198/488

Primary Examiner—L. J. Paperner
Attorney, Agent, or Firm—Allison C. Collard; Thomas M. Galgano

[57] ABSTRACT

An apparatus for stacking and unstacking trays, especially adapted for use in connection with Mogul machines includes a base, a plurality of links and a generally vertically-disposed elevator frame pivotably mounted on the base by means of the links for reciprocal movement over an arcuate path between two laterally-displaced end positions. A gripper device for retaining and releasing trays is mounted on the elevator frame for longitudinally-displaceable movement relative thereto.

4 Claims, 5 Drawing Figures

Fig: 2

STACKING AND UNSTACKING APPARATUS

This invention relates to apparatus for stacking and unstacking trays. More particularly, it relates to such an apparatus especially adapted for use in association with Mogul machines.

A Mogul machine comprises a plurality of stations and is used for the production of confectionary. An unstacker is provided at its input while a stacker is provided at the output, for trays which, when filled, pass through accurately-maintained temperature-controlled rooms, in which the confectionary is cooled.

Known stackers and unstackers for this purpose operate after the style of endless conveyors and transfer one or a plurality of trays simultaneously. These devices are relatively expensive if high operational reliability is to be obtained. In addition, stackers and unstackers of the endless conveyor type tend to cause considerable vibration, which disturbs the work cycle.

Accordingly, the object of the invention is to provide a stacking and unstacking apparatus which is a simple but rugged construction and which operates absolutely reliably and substantially without vibration.

To this end, according to the invention, the stacking and unstacking apparatus comprises a stand having pivotally mounted and driven links for an elevator frame in which a gripper system is longitudinally displaceable.

The pivotally mounted and driven links lift the elevator frame back and forth, while independently thereof the gripper system is adapted to move up and down in the elevator frame, so that one or more trays can be taken from a stack or be piled up to form a new stack. The gripper system comprises in known manner two grippers which are in line with one another and which are fixed on chains but which, in a development of the invention, do not rotate like an endless conveyor, but are simply adapted to move up and down.

Further features of the invention will be apparent from the description and claims in connection with the drawings.

The invention is described in detail below with reference to an exemplified embodiment illustrated in the drawings wherein.

Figure 1:
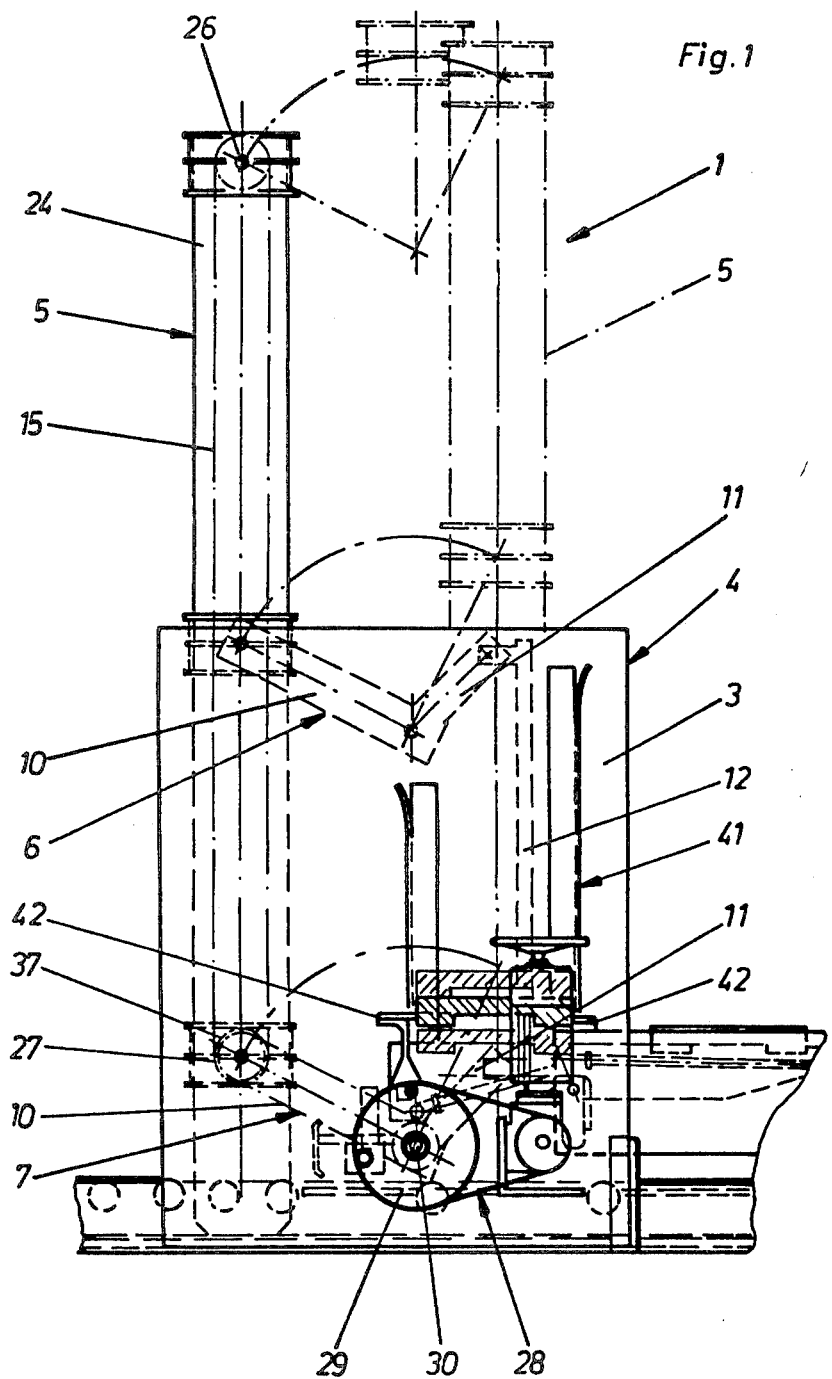
FIG. 1 is a side elevation of an unstacker according to the invention.
Figure 2:
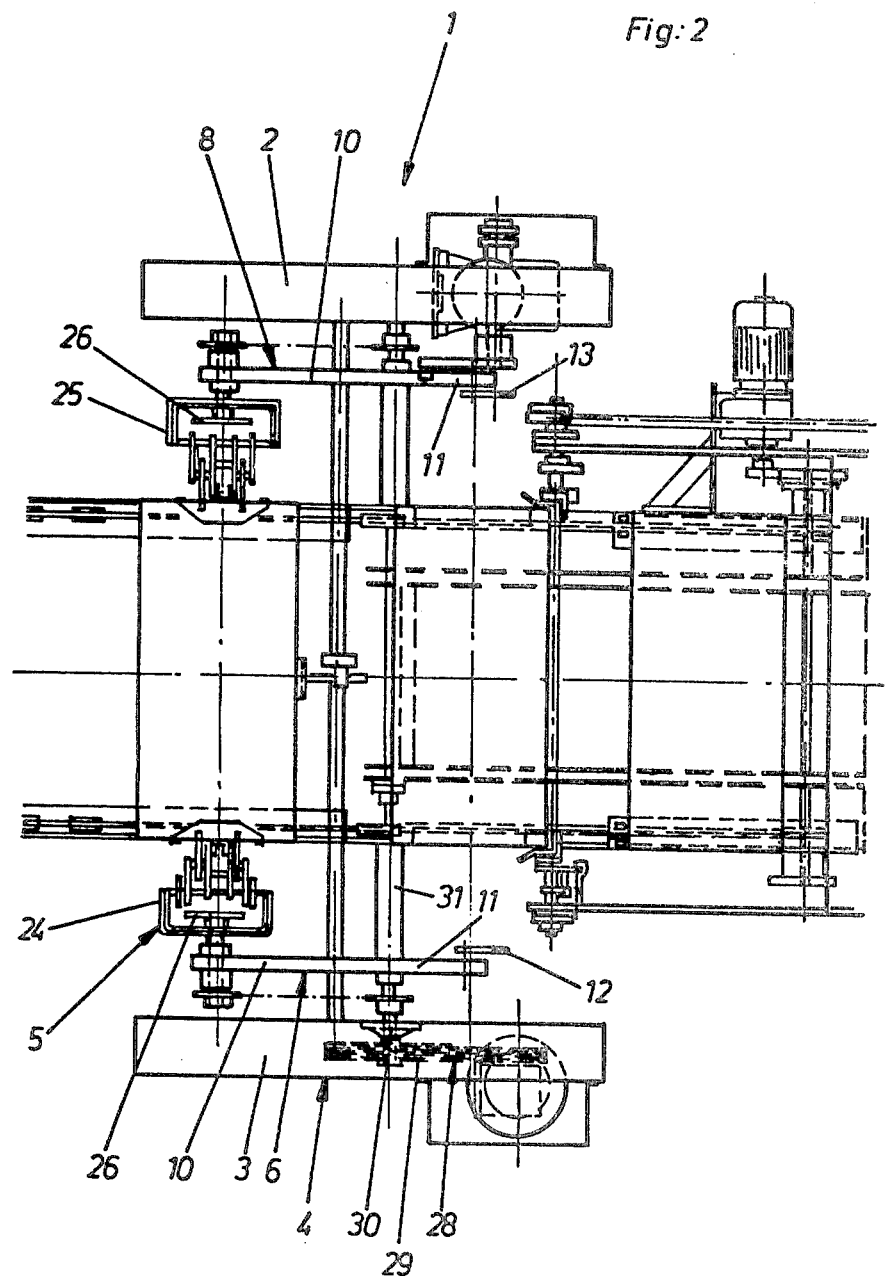
FIG. 2 is a plan view thereof.
Figure 3:
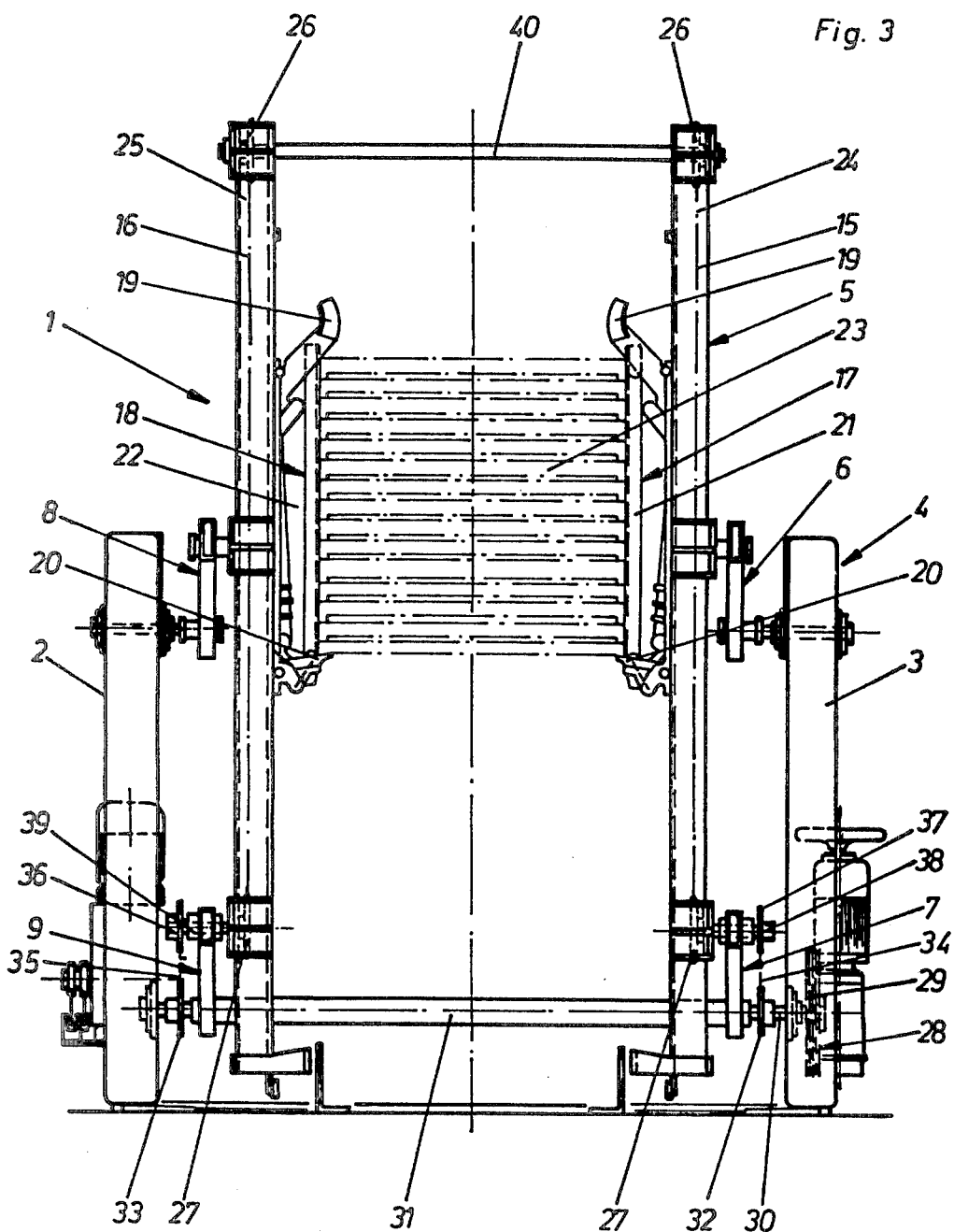
FIG. 3 is a left end view of FIG. 1.

Referring to FIGS. 1 to 3, the unstacker 1 according to the invention comprises a stand or base 4 consisting of two side parts 2 and 3 and an elevator frame 5 pivotally mounted in stand 4. Links 6, 7, and 8, 9, respectively, are pivotally mounted on the side parts 2 and 3, respectively, to mount elevator frame 5 and these links are in the form of bell cranks each having two lever arms 10, 11. The elevator frame is articulated on the longer arms 10, while the shorter arms 11 on one side are interconnected by an articulated coupling 12, 13 which acts as a pushrod.

As will be apparent from the solid-line and chain-dotted line positions in FIG. 1, frame 5 may assume a left-hand and right-hand end position, and is pivotable between these two end positions by means of the links. Frame 5 is pivoted by means of a drive, the details of which will be explained in connection with the stacker shown in FIG. 4.

As best shown in FIG. 3, a gripper system consisting of two grippers 17 and 18 which are aligned with one another and which are fixed on chains 15 and 16, respectively, is adapted to move up and down in frame 5. Each gripper 17, 18, has a sensor 19 and a driver 20 interconnected via articulated rods 21 and 22. Sensors 19 control the position of drivers 20 via the rods 21, 22 and ensure that they engage beneath and lift one or more trays 23 at the correct time.

Frame 5 consists of two laterally-disposed members 24, 25, for example, of U-shaped cross-section, between the limbs of which chains 15, 16, run around top and bottom reversing wheels 26, 27 respectively. A drive system 28 drives chains 15 and 16 and comprises a drive wheel 29, the shaft 30 of which is axially coupled with the pivot shaft 31 of the bottom two links 7, 9. Two chain wheels 32, 33 are provided on shaft 30 and by way of chains 34, 35 drive sprocket wheels 36, 37 mounted to be freely rotatable in the longer arm 10 of the two bottom links 7, 9. The shafts 39 and 38 of the sprocket wheels 36, 37, are mounted to be freely rotatable at the free end of the longer arm 10 of the bottom links and also carry the bottom reversing wheels 27 for chains 15, 16. The two top reversing wheels 26 of chains 15, 16 are mounted on a shaft 40 which is the sole element interconnecting the two members 24, 25 of frame 5.

Figure 4:
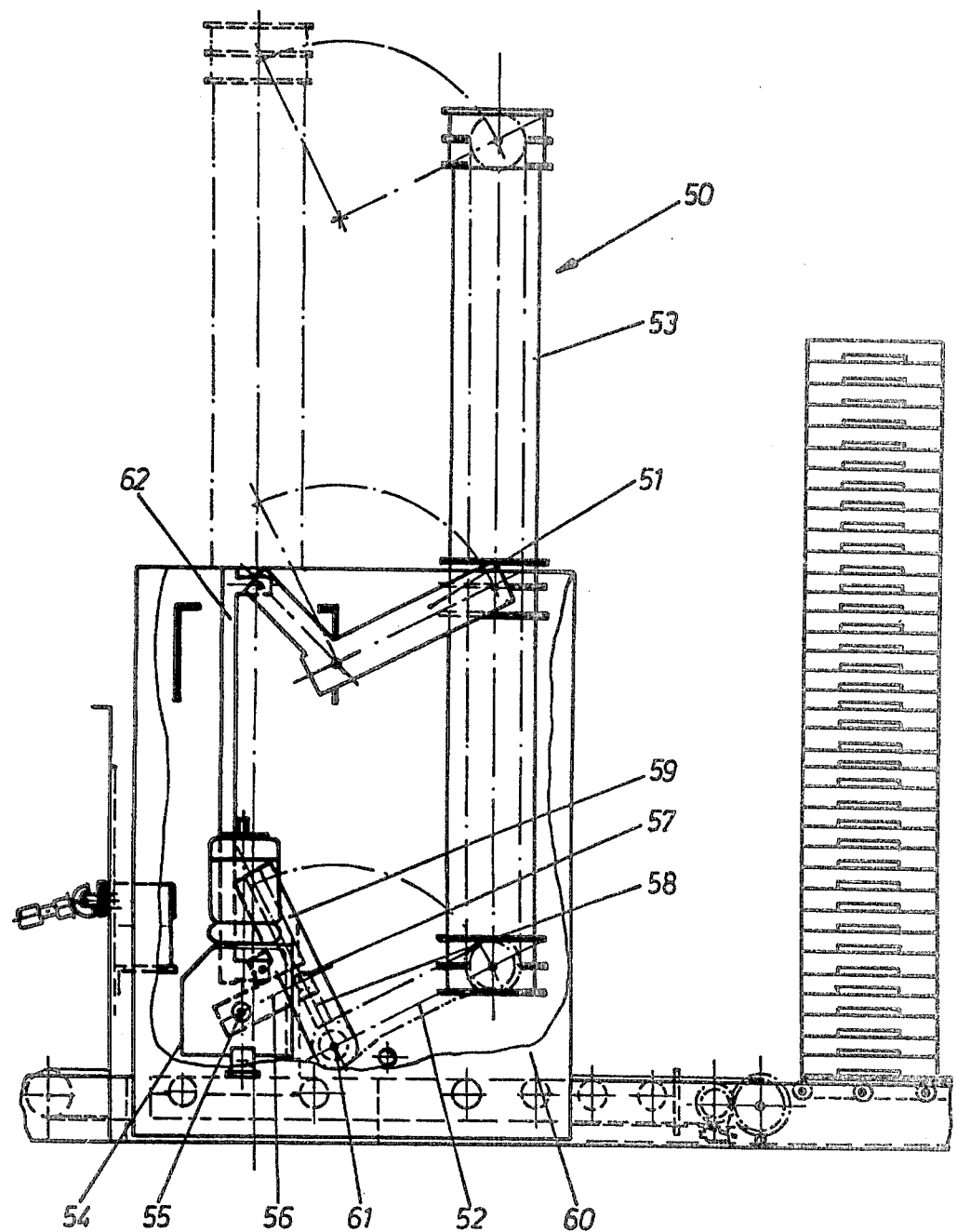
FIG. 4 is a side elevation of the stacker according to the invention.
Figure 5:
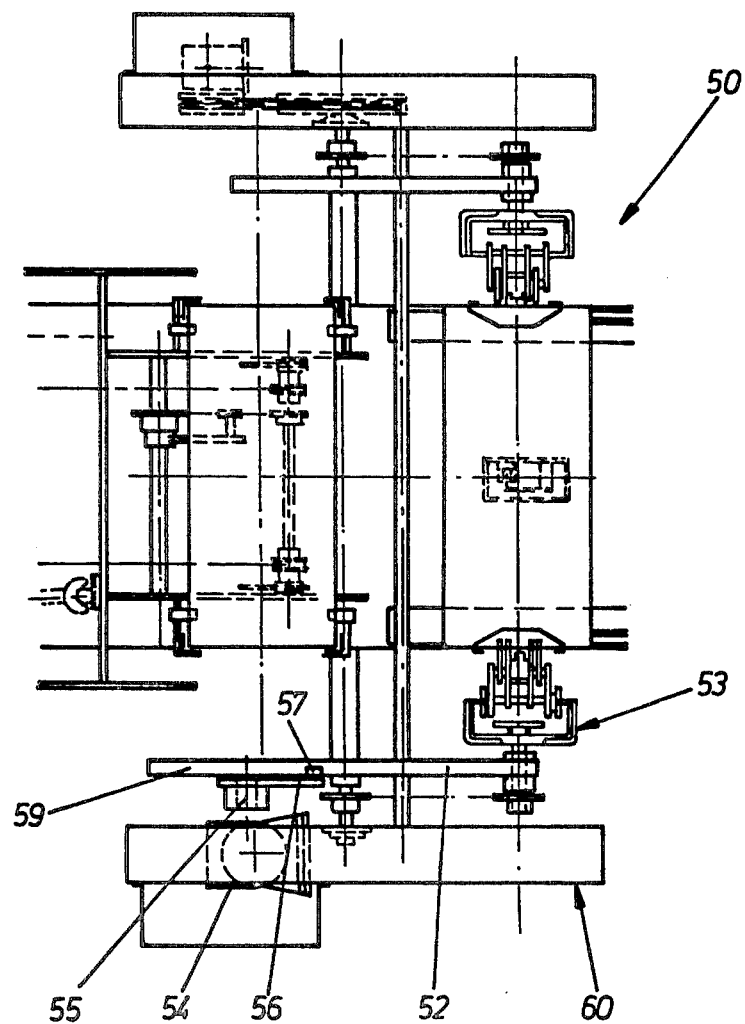
FIG. 5 is a plan view of the stacker shown in FIG. 4.

The unstacker 1 operates as follows:

It will be assumed that a stack of trays 23 is situated between the two members 24, 25 of frame 5 in FIG. 1. The two grippers 17, 18 are lifted by means of chains 15, 16 until the two sensors pivot towards one another above the top tray 23 (see FIG. 3), so that drivers 20 engage beneath that tray 23 which is situated within their path of movement. Grippers 17, 18 have now lifted the stack of trays 23 to a position below shaft 40, and frame 5 is then pivoted to the right into the chain-dotted position from the left-hand position shown in FIG. 1. Those parts which produce the pivoting movement are shown in FIGS. 4 and 5, which illustrate the stacker, and are described in detail below. In the right-hand position grippers 17, 18, are then lowered, so that trays 23 are introduced into a magazine or separating system 41 known per se, which is not therefore described in detail. As grippers 17, 18 are lowered further, the stack of trays 23 is deposited on holder elements 42 of the separating system 41. This is possible because grippers 17, 18 continue to move down past separating system 41, the sensors being pressed outwardly and away from one another by the width of the trays, so that drivers 20 swing up.

As soon as grippers 17, 18 reach their bottom end position or just before then, frame 5 is swung back into its left-hand initial position shown in FIG. 1, above the stack of trays still there. As soon as grippers 17, 18 are lifted again, sensors 19 slide along the stack until they pivot towards one another above the top tray 23 and thus bring drivers 20 into the driving position. The same cycle as described above is then repeated.

The stacker 50 is shown in FIGS. 4 and 5 does not differ basically from the unstacker 1. It simply has the opposite direction of conveyance. Unstacker 1 also operates from a lower level at the left on to a higher level on the right unlike the stacker 50, which operates from a higher level on the left to a lower level on the right.

FIG. 4 clearly shows a preferred drive 54 for pivoting the stacker frame 53 or frame 5 of unstacker 1. The drive 54 is an arm 56 which is disposed on a drive shaft 55 and which has a roller 57 slidable in a guide 58 on the arm 59 of the bottom link 52 which is not articulated on frame 53. If drive shaft 55 is turned anti-clockwise by arm 56 as shown in FIG. 4, roller 57 moves in the guide 58 upwardly, with a slight inclination to the left, at first, and then pivots the link in the anti-clockwise direction about its pivot axis or shaft 61 in the stand or base 60. During the pivoting of frame 53 roller 57 follows a circular path about drive shaft 55.

The two links 51 and 52 are again interconnected by a coupling 62 which acts as a push rod, and all the other parts in stacker 50 are identical to those in the unstacker 1. It is therefore unnecessary to describe the individual parts.

To ensure that the required movements take place, various limit switches are provided and the transmission ratios of the drive and sprocket wheels are so selected that the stacking and unstacking operation take place satisfactorily.

The apparatus according to the invention receives the stack very slowly and also moves very smoothly because of the special drive. This quiet and smooth operation is an important advantage of the apparatus and distinguishes it from other stacking and unstacking devices.

While only several embodiments of the present invention have been shown and described, it will be obvious to those persons of ordinary skill in the art that many changes and modifications may be made thereunto, without departing from the spirit and scope of the invention.

What is claimed is:

1. An apparatus for stacking and unstacking trays, comprising:
   a base;
   a plurality of links, each of said links comprising a bell crank having two arms, and said links being arranged in generally vertically spaced-apart pairs each comprising an upper link and a lower link, the links of each pair being interconnected via couplings to permit synchronous movement thereof and the lower link of each of said pairs of links has one arm having a longitudinally-extending guide;
   a generally vertically-disposed elevator frame pivotably mounted on said base by means of said links for reciprocal movement over an arcuate path between two laterally-displaced end positions;
   a gripper device for retaining and releasing trays mounted on said elevator frame for generally vertical reciprocal movement between an upper position and a lower position; and
   drive means coupled to said lower links of each of said pairs for effecting pivotal movement of said links and, in turn, said frame between said end positions thereof, said drive means includes a drive shaft, an arm secured to said shaft having a roller rotatably secured thereto which is received within said guide for displaceable movement therein.

2. The apparatus according to claim 1, wherein said gripper device comprises two-spaced apart and aligned gripping elements and wherein said elevator frame has a pair of spaced-apart vertically-moving chains on each of which one of said gripping elements is mounted.

3. An apparatus for stacking and unstacking trays, comprising:
   a base;
   a plurality of links, each of which comprise a bell crank having two arms and being arranged in generally, vertically spaced-apart pairs, each comprising an upper link and a lower link, said links of each pair of being interconnected via couplings to permit synchronous movement thereof;
   a generally, vertically-disposed elevator frame pivotably mounted on said base by means of said links for reciprocal movement over an arcuate path between two laterally-displaced end positions, said elevator frame having a pair of spaced-apart, vertically reciprocal chains mounted thereon; and
   a gripper device for retaining and releasing trays which is mounted on said pair of chains of said elevator frame for generally, vertical, reciprocal movement between an upper and a lower position.

4. The apparatus according to claim 3, wherein the lowermost links of each of said pairs of links has one arm having a longitudinally-extending guide which is not articulated on said frame and wherein said apparatus additionally includes drive means coupled to said lowermost links of each of said pairs for effecting pivotal movement of said links and, in turn, said frame between said end positions thereof, said drive means including a drive shaft, an arm secured to said shaft having a roller rotatably secured thereto which is received within said guide for displaceable movement therein.

* * * * *